United States Patent
Felstead

[11] 4,025,166
[45] May 24, 1977

[54] ACOUSTO-OPTIC LIGHT BEAM SCANNER

[75] Inventor: E. Barry Felstead, Kanata, Canada

[73] Assignee: Canadian Patents and Development Limited, Ottawa, Canada

[22] Filed: Jan. 12, 1976

[21] Appl. No.: 648,584

[52] U.S. Cl. .......................... 350/161 W; 350/150
[51] Int. Cl.² .......................................... G02F 1/33
[58] Field of Search ............................ 350/161, 150

[56] References Cited
UNITED STATES PATENTS 3,822,379  7/1974  Brienza ............................. 350/161

OTHER PUBLICATIONS

IBM Tech. Discl. Bull., vol. 13, No. 1, June 1970, pp. 269–270, (E.G.H. Lean).

*Primary Examiner*—Robert J. Webster
*Attorney, Agent, or Firm*—Edward Rymek

[57] ABSTRACT

A light beam scanner consisting of an acoustic cavity having a length $l$, a width $w$ between two side surfaces and a thickness $t$ between the other two side surfaces. The cavity is transparent to optical energy and is capable of supporting acoustic energy of frequency $f$ reflected through the length of the cavity at an angle of incidence $\theta$ to the remaining surfaces, where $$\theta = \cos^{-1} \frac{mv}{2t} \frac{1}{f}$$

where $m$ is an integer and $v$ is the velocity of acoustic energy in the cavity. Acoustic waves at a controlled frequency $f$ are generated in one end of the cavity from one of the remaining side surfaces so as to have a continuous distribution of direction. A beam of collimated monochromatic light having a wavelength $\lambda$ is directed onto one of the side surfaces either substantially perpendicular to it or at the Bragg angle, to be transmitted through the cavity and diffracted by the acoustic energy in the cavity. Focussing means focusses the diffracted beam onto a plane where it appears at a point $\theta$, $d$, where $$d = \frac{\lambda f_l}{v} f$$

where $f_l$ is the focal length of the focussing means.

6 Claims, 5 Drawing Figures

ACOUSTO-OPTIC LIGHT BEAM SCANNER

This invention is directed to a light beam scanner and in particular to an acousto-optic light beam scanner.

Traditionally mirrors have been employed to scan light beams. Either multi-facetted mirrors have been rotated by a motor or a plane mirror has been oscillated by a galvanometer. In the late 1930's there was considerable work on the application of ultrasonic light modulators to deflecting light for the purpose of generating television pictures, however the use of cathode ray tubes became prevalent. More recently, electro-optical deflectors were developed but have been largely superceded by a redevelopment of acousto-optic deflectors. These acousto-optic deflectors utilize travelling ultrasonic waves in a transparent medium. The travelling waves form the equivalent of a moving phase grating to the light impinging on them. This grating diffracts the light and by changing the ultrasonic frequency, the diffraction angle is changed. Thus by sweeping the drive frequency, the light beam is scanned.

Mirror scanners operate well at low scan rates but require very sophisticated and expensive technology for high scan rates. There is difficulty, at the high scan rates, to control stability; air or magnetic bearings are needed and mirrors must be of special materials to withstand the strains involved. Mechanical scanners generally give a continuous scan so that random scanning is not possible.

Present acousto-optic deflectors require very wide frequency sweeps, typically 100 MHz, to give an adequate number of resolution spots. Thus, voltage controlled oscillators and high power amplifiers are required that operate over a very wide frequency band. These are both expensive and bulky. Also, because of the wideband operation, very special ultrasonic transducers are required.

It is an object of this invention to provide an acousto-optic scanner for rapidly scanning a light beam.

It is another object of this invention to provide an acousto-optic light beam scanner capable of random scanning.

It is a further object of this invention to provide an acousto-optic light beam scanner which requires a small acoustic frequency sweep in operation.

It is another object of this invention to provide an acousto-optic light beam scanner which is simple to manufacture.

These and other objects are achieved in a light beam scanner which includes an acoustic cavity having a length $l$, a width $w$ between side surfaces and a thickness $t$ between the two remaining side surfaces which are prependicular to the side surfaces. The cavity is transparent to optical energy and is capable of supporting acoustic energy of frequency $f$ reflected through the length of the cavity at an angle $\theta$ to said remaining surfaces where:

$$\theta = \cos^{-1} \frac{mv}{2t} \frac{1}{f}$$

where $m$ is an integer and $v$ is the velocity of acoustic energy in the cavity. Acoustic waves at a controlled frequency $f$ are generated in one end of the cavity so as to have a continuous distribution of direction. A beam of collimated monochromatic light having a wavelength $\lambda$ is directed onto one of the side surfaces either substantially perpendicular to it or at the Bragg angle to be transmitted through the cavity and diffracted by the acoustic energy in the cavity. Focussing means focusses the diffracted beam onto a plane where it appears at a point $\theta$, $d$, where $$d = \frac{\lambda f_l}{v} f$$

where $f_l$ is the focal length of the focussing means.

The acoustic energy may be generated by an electro-acoustic transducer having a segmented electrode for generating an acoustic wave with a continuous distribution of direction which is launched in the cavity. Alternately the acoustic energy may be generated by an electro-acoustic transducer that launches an acoustic wave into one end of the cavity which has a curved surface to produce a continuous distribution of direction. Either of these transducers are driven by an oscillator, the output frequency of which is controlled by a control circuit.

In the drawings:

FIG. 1 schematically illustrates the acousto-optic light beam scanner in accordance with this invention.

Figure 1:
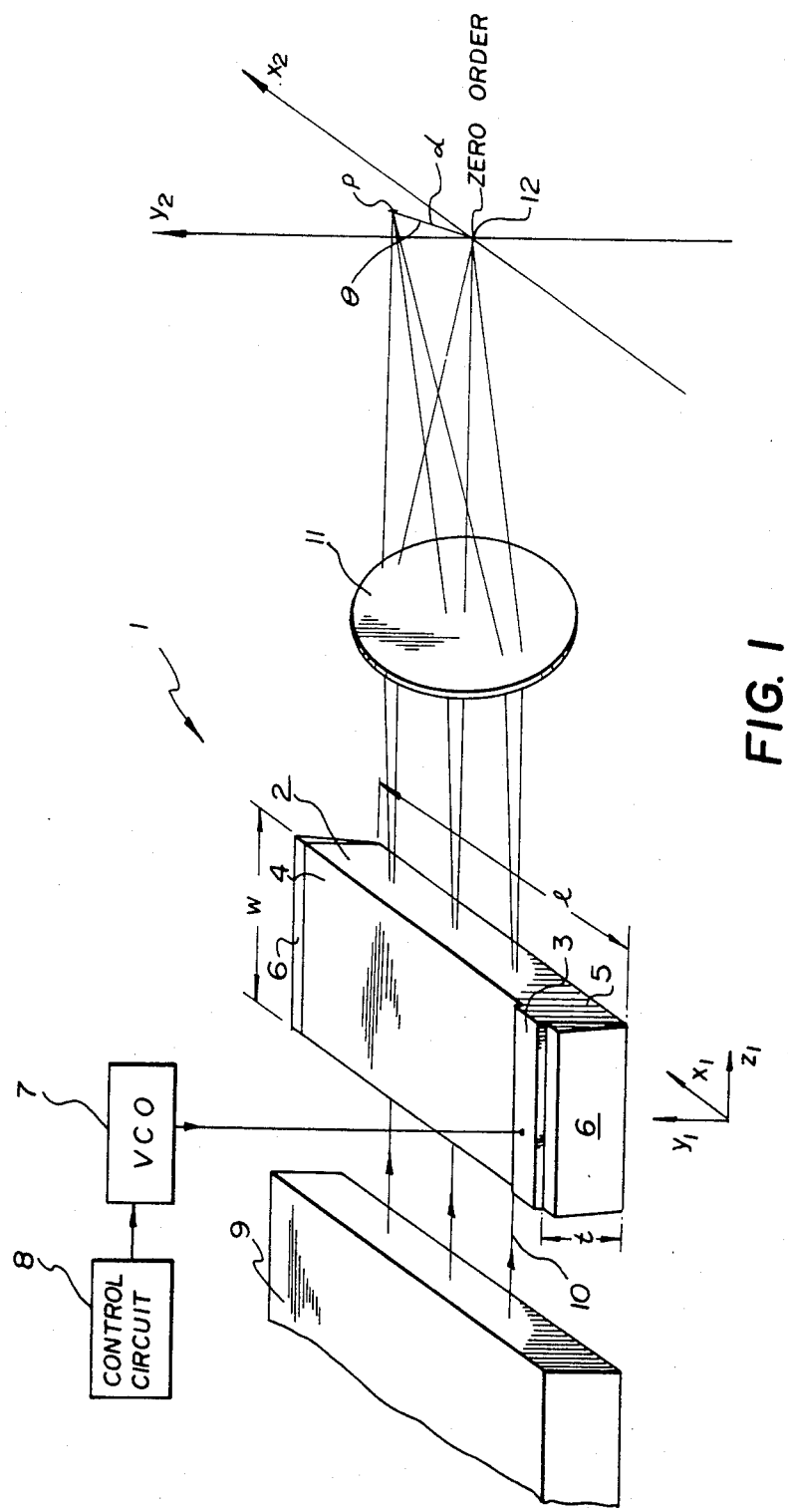
Figure 2:
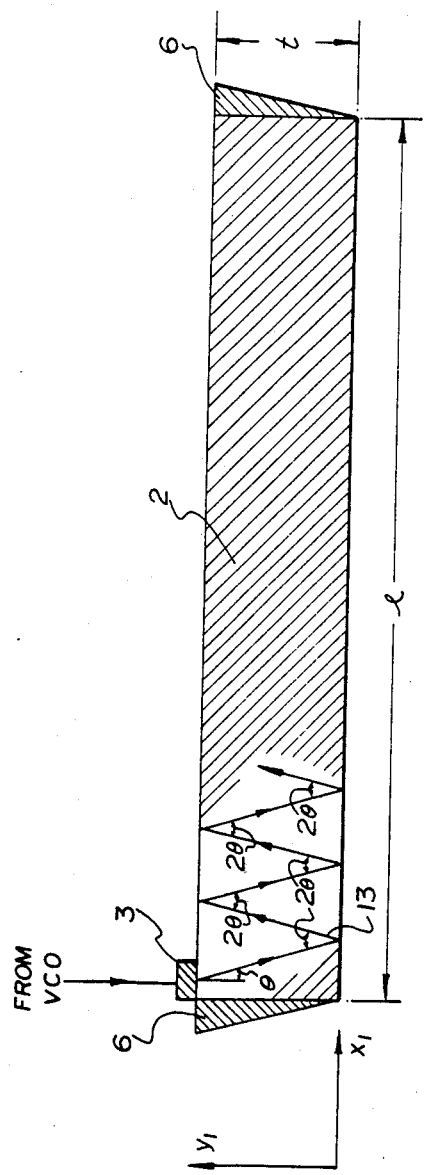
FIG. 2 is a cross-section along the length of the acoustic cavity.

The basic light beam scanner 1 in accordance with this invention is described with respect to FIGS. 1 and 2. Scanner 1 includes an acoustic cavity 2 upon which is mounted an ultrasonic transducer 3 that launches ultrasonic waves at a selected frequency $f$ into the cavity 2. The cavity 2 and transducer 3 are arranged such that the ultrasonic waves have a continuous distribution $\theta$ within the cavity 2. Arrangement of the transducer 3 and cavity 2 to achieve the distribution of directions will be described with respect to FIGS. 4 and 5. The cavity 2 has a thickness $t$ between surfaces parallel to the $x_1$-$z_1$ plane, a width $w$ between sides parallel to the $x_1$-$y_1$ plane and a length $l$. The cavity 2 must also be transparent to a light beam, should have a low acoustic attenuation, and 100% acoustic reflection at the top surface 4 and the bottom surface 5. A fused quartz or glass material surrounded by air satisfactorily meets these conditions. The transducer 3 which is small, occupies a negligible area of surface 4 such that it does not interfere with the resonance of cavity 2. Finally, acoustic absorbers 6 may be placed at each end of the cavity 2 such that the cavity 2 is equivalent to one of infinite length in the $x$-direction.

A variable oscillator 7, drives the transducer 3 by applying an rf signal to it. The frequency $f$ of the oscillator signal is dependent on the output of a control circuit 8 connected to oscillator 7. The oscillator 7 may be any conventional type such as a voltage-controlled oscillator. However, it is preferred that controlled oscillator 7, under the control of an input signal from control circuit 8, be capable of providing a swept signal over a small frequency band for continuous scanning, or of providing signals having discrete frequencies for random access scan. A light source 9, such as a laser, directs a beam 10 of collimated monochromatic light of wavelength $\lambda$ substantially perpendicularly onto the side of cavity 2. The cross-section of beam 10 should preferably cover the entire side surface of cavity 2. A lens 11 focusses the beam 10 transmitted through and emitted from cavity 2, to a point on a plane $x_2$-$y_2$ that is parallel to the $x_1$-$y_1$ plane. A planar translucent screen (not shown) may be placed in the $x_2$-$y_2$ plane to observe the scanning light beam.

In operation, when no oscillator signal is applied to transducer 3, the light beam 10 is transmitted through the acoustic cavity 2 and is focussed by the lens 11 at the zero order point 12 on the $x_2$-$y_2$ plane. When an oscillator signal having a specific frequency $f$ is applied to the transducer 3, ultrasonic waves having a continuous distribution of direction $\theta$ are launched into the cavity 2. For a specific frequency $f$, cavity 2 will support acoustic waves at a specific angle $\theta$ as shown in FIG. 2. The angle $\theta$ is given by:

$$\cos\theta = \frac{mv}{2t} \frac{1}{f} \quad (1)$$

where
$m$ is an integer.
$v$ is the velocity of the acoustic wave in the cavity and
$t$ is the thickness of the cavity.

Figure 3:
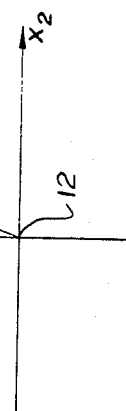
FIG. 3 is a view of the trajectory of the scanning point.

The ultrasonic wave 13 supported by the cavity 2 will diffract the light beam passing through the cavity 2 such that the beam 5 will be focussed at a point $p$ on the $x_2$-$y_2$ plane as shown in FIGS. 2 and 3. The light beam takes the form of a short vertical line 14 whose center is located a distance $d$ from the optical axis i.e. the zero order point 12, $d$ is given by $$d = \frac{\lambda f_l}{v} f \quad (2)$$

where
$f_l$ is the focal length of lens 12;
$\lambda$ is the wavelength of the light beam 10;
$f$ is the acoustic wave frequency; and
$v$ is the velocity of the acoustic wave.

In addition, the point $p$ is on a line subtended by the angle $\theta$ from the vertical axis $y_2$. As $f$ is varied, both $\theta$ and $d$ will vary to form a locus of scan points 15. For large variations of $f$, this locus of points 15 will form a nonlinear pattern in the $+x_2$ and $+y_2$ quadrant. Identical patterns will also be simultaneously formed in the three other quadrants due to the 90° angle of incidence of beam 10 on cavity 2 as well as the travel of the acoustic wave 13 in the upward and downward direction in cavity 2. For a short selected section of the trajectory 15, particularly where $\theta < 30°$ as shown in FIG. 3, the trajectory 15 is very nearly linear and provides an effective one dimensional scan line. This occurs since a relatively small increase in frequency $f$ will give a substantial increase in $\theta$ whereas the value of $d$ will increase relatively little for the same increase in frequency.

The vertical line 14 will be narrow in the direction of scan. Line 14 will have a width of approximately $\Delta x_2 = 2\lambda f_l/l$ if the beam impinges on the entire length $l$ of the cavity in the $x_1$ direction as shown in FIG. 1. Thus, the longer the cavity 2 the greater will be the number of possible resolution spots. The length of line 14 will be similarly dependent on the thickness of the cavity 2.

In certain cases there may be a problem with interfering outputs due to additional acoustic waves in the cavity 2. Suppose that $m = M$ is the desired integer value of $m$ in equation (1). For some combinations of parameters it may be possible for acoustic waves at $\theta$'s calculated for $m = M + 1$ or $M - 1$ to generate light pattern that falls on the desired pattern's locus shown in FIG. 3. Such undesired acoustic waves may be suppressed by the well-known technique of using a second resonant cavity attached directly to cavity 2.

In order to utilize the optical energy from the light source 9 more efficiently, since, as described above a scan spot is formed in each of the four quadrants, the scan spots in the lower quadrants, i.e. the $-x_2$, $-y_2$ quadrant and the $x_2$, $-y_2$ quadrant, may be suppressed by arranging the light source 9 or the cavity 2 such that the angle of incidence of the light beam 10 on cavity 2 is at approximately the Bragg angle to the $x_1$-$z_1$ plane. The beam 10 from source 9 will therefore not be normal to the side of cavity 2, but will enter at a small angle thereto, i.e. an angle which usually is not greater than a few degrees. Though the Bragg angle is dependent of $f$, a fixed angle of incidence may be maintained since the frequency sweep range required to achieve a satisfactory scan is small.

Figure 4:
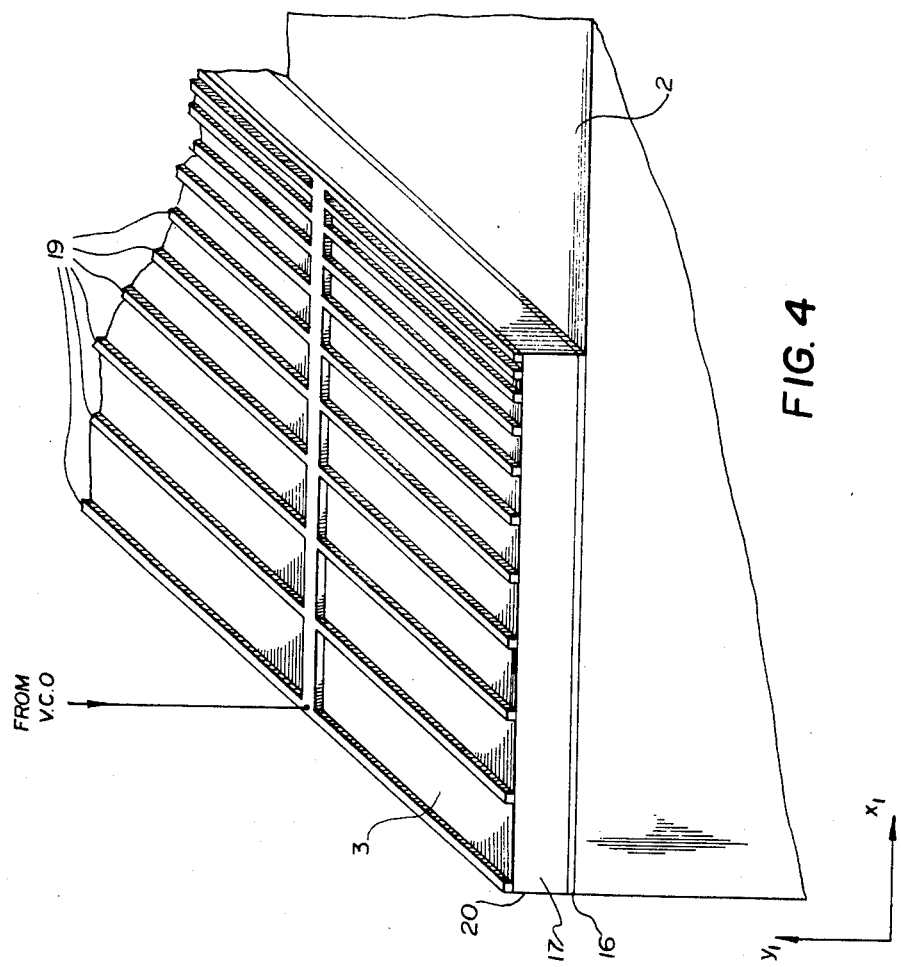
FIG. 4 illustrates a transducer configuration for launching acoustic waves having a continuous directional distribution.

As discussed above, it is necessary to generate acoustic waves with a continuous distribution of direction. Traditional transducers such as piezo-electric crystals are usually flat plates and launch a plane wave in but a single direction. The electrode of such a transducer continuously cover the crystal. FIG. 4 illustrates one embodiment of a transducer cavity combination in which acoustic waves with a continuous distribution of direction are generated. The transducer 3 consists of a first thin electrode 16 fixed to the top of cavity 2, a crystal 17 fixed to electrode 16 and, a segmented electrode 18 on the surface of the crystal 17. The segments 19 are all interconnected for connection to the variable oscillator and the spacing between adjacent segments is inversely proportional to their distance $x_1$ from edge 20 of the transducer 3 to form a linear frequency-modulation pattern.

Figure 5:
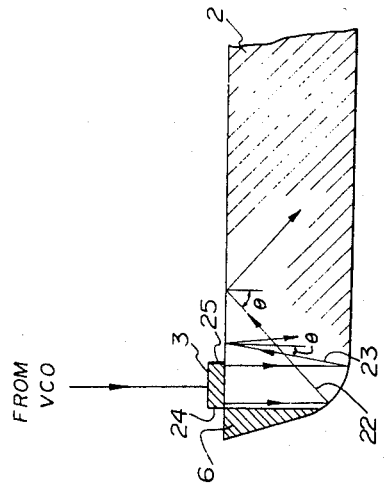
FIG. 5 illustrates a cavity in which acoustic waves having a continuous directional distribution are produced.

FIG. 5 illustrates a second embodiment of a transducer cavity combination in which acoustic waves with a continuous distribution of direction are generated.

The transducer 3 is fixed to the top of cavity 2, however the bottom surface 21 of the cavity 2 opposite the transducer is curved to take a partial cylindrical shape. The transducer 3 launches a single wave directly into the cavity 2 and the wave is reflected by the surface 21 to produce a converging acoustic beam which is composed of the desired distribution of angular components bounded by lines 22 and 23. One component having an angle $\theta$ will be supported by the cavity 2 and will be propagated through the cavity 2. To provide for efficient use of the acoustic wave, the wave emanating from side 24 of the transducer 3 should be reflected to produce the maximum desired reflected angle $\theta$ while the wave emanating from side 25 of the transducer 3 should be reflected to produce the minimum desired reflected angle $\theta$.

I claim:
1. A light beam scanner comprising:
an acoustic cavity transparent to optical energy having a predetermined length $l$ between two end surfaces, a width $w$ between two side surfaces and a substantially constant thickness $t$ between the two remaining surfaces which are perpendicular to the side surfaces, said cavity being capable of support- ing acoustic energy of frequency $f$ reflected through the length of the cavity at an angle of incidence $\theta$ to said remaining surfaces, where $$\theta = \cos^{-1} \frac{mv}{2t} \frac{1}{f}$$

where $m$ is an integer and $v$ is the velocity of acoustic energy in the cavity;

means for generating ultrasonic waves of controlled frequency $f$ having a continuous distribution of direction in one end of said cavity;

light source means for directing a beam of collimated monochromatic light having a wavelength $\lambda$ onto one of said side surfaces to be transmitted through said cavity and diffracted by said acoustic energy; and means for focussing the light beam leaving said cavity onto a plane at a point $\theta$, $d$, where $$d = \frac{\lambda f_l}{v} f$$

where $f_l$ is the focal length of the focussing means.

2. A light beam scanner as claimed in claim 1 wherein said generating means includes variable oscillator means for generating a signal having a frequency $f$ within a predetermined frequency range and control means coupled to the oscillator means for determining the frequency $f$.

3. A light beam scanner as claimed in claim 2 wherein said generating means further includes an electro-acoustic transducer means located on one of the remaining surfaces and having a segmented electrode coupled to said oscillator means for launching an acoustic wave having a continuous distribution of direction into said cavity.

4. A light beam scanner as claimed in claim 2 wherein said generating means further includes an electro-acoustic transducer on one of the remaining surfaces and coupled to said oscillator means for launching an acoustic wave into said cavity, the other remaining surface being curved to reflect the acoustic wave to produce a wave having a continuous distribution of direction.

5. A light beam scanner as claimed in claim 1 which further includes acoustic absorbing means fixed to each end of said cavity.

6. A light beam scanner as claimed in claim 1 wherein the light source means is fixed with respect to the cavity such that the light beam is incident on said side surface at substantially the Bragg angle.

* * * * *